United States Patent [19]

Feiring et al.

US005182342A

[11] Patent Number: 5,182,342

[45] Date of Patent: Jan. 26, 1993

[54] HYDROFLUOROCARBON SOLVENTS FOR FLUOROMONOMER POLYMERIZATION

[75] Inventors: Andrew E. Feiring; Carl G. Krespan; Paul R. Resnick; Bruce E. Smart, all of Wilmington, Del.; Theodore A. Treat, Washington, W. Va.; Robert C. Wheland, Wilmington, Del.

[73] Assignee: E. I. Du Pont de Nemours and Company, Wilmington, Del.

[21] Appl. No.: 843,754

[22] Filed: Feb. 28, 1992

[51] Int. Cl.⁵ ............................................... C08F 2/00
[52] U.S. Cl. ..................................... 526/206; 526/247; 526/255
[58] Field of Search ................. 526/206, 247, 255

[56] References Cited

U.S. PATENT DOCUMENTS

| | | | |
|---|---|---|---|
| Re. 32,199 | 7/1986 | Carlson | 526/206 |
| 3,528,954 | 9/1970 | Carlson et al. | 260/87.5 |
| 3,616,371 | 10/1971 | Ukihashi et al. | 204/159.22 |
| 3,635,926 | 1/1972 | Gresham et al. | 260/87.5 |
| 4,029,868 | 6/1977 | Carlson | 526/247 |
| 4,123,602 | 10/1978 | Ukihashi et al. | |
| 4,158,678 | 6/1979 | Tatemoto et al. | 260/159.15 |
| 4,243,770 | 1/1981 | Tatemoto et al. | 525/331 |
| 4,499,249 | 2/1985 | Nakagawa et al. | 526/206 |
| 4,714,756 | 12/1987 | Buckmaster | 528/481 |
| 4,946,936 | 8/1990 | Moggi et al. | 528/392 |
| 4,948,844 | 8/1990 | Nakahara et al. | 525/356 |

FOREIGN PATENT DOCUMENTS

| | | | |
|---|---|---|---|
| 0077998 | 5/1983 | European Pat. Off. | 526/247 |
| 63-235334 | 9/1988 | Japan | 526/247 |
| 1151293 | 6/1989 | Japan | |

*Primary Examiner*—Joseph L. Schofer
*Assistant Examiner*—N. Sarofim

[57] ABSTRACT

A novel process for the free radical polymerization of fluoromonomers in which selected hydrofluorocarbon solvents are used. The solvents have little effect on atmospheric temperature and ozone concentrations. The polymers produced are useful as thermoplastics and elastomers.

25 Claims, No Drawings

HYDROFLUOROCARBON SOLVENTS FOR FLUOROMONOMER POLYMERIZATION

BACKGROUND OF THE INVENTION

Field of the Invention

This invention relates to a fluoromonomer polymerization process conducted in the presence of an initiator and in a solvent which contains only C, F and H and optionally ether oxygen or alcohol, and which does not cause appreciable chain transfer or otherwise interfere with the polymerization of fluoromonomers. The polymers obtained are useful as thermoplastics and elastomers.

Technical Background

Solvents are useful components of free radical catalyzed fluoromonomer polymerization processes. Even if the polymerization is not carried out in an organic solvent, for example in aqueous emulsion, small amounts of organic solvents are often useful, for example for adding organic soluble components such as initiators. Polymerization of monomers containing vinylic fluorine is often difficult, for example undergoing chain transfer or termination reactions in the presence of many organic compounds that contain hydrogen bound to carbon. The presence of such compounds results in polymers with lower molecular weights than desired and/or a lowered yield of polymer. Various compounds have been proposed as solvents for such polymerizations.

Among the solvents which have been disclosed for fluoromonomer polymerizations are compounds containing (besides carbon): chlorine, fluorine and hydrogen (see for example U.S. Pat. Nos. 4,499,249, 4,714,756, 3,635,926, 4,029,868, 3,528,954, and Re. 32,199); fluorine (see for example U.S. Pat. Nos. 3,635,926, Re. 32,199, 4,499,249, and 4,948,844); and chlorine and fluorine (see U.S. Pat. No. 4,948,844). None of these patents mentions the use of solvents containing only C, F and H.

U.S. Pat. No. 3,616,371 discloses the use of various fluorinated solvents, including $C_2H_3F_3$ and $C_2H_4F_2$, for use in polymerizations to form homo- or copolymers of vinylidene fluoride. No other solvents containing only carbon, hydrogen and fluorine are mentioned.

U.S. Pat. No. 4,123,602, at Col. 5, lines 52–60, discloses the use of various fluorocarbon type solvents.

Japanese Patent Application 1/151,293 discloses the use of compounds of the formula $CH_3R$, where R is perhaloethyl or perhalomethyl ("halo" including fluorine) as solvents for the production of fluorine containing polymers. This application states that the groups —$CH_2F$ and —$CHF_2$ "... have substantial chain transfer capability to fluoroolefins, ... ". No other compounds, aside from $CH_3R$, are mentioned as useful solvents for the polymerization.

U.S. Pat. No.4,243,770 discloses a process for producing an easily cross linkable fluorine containing polymer, using as a solution polymerization medium solvents which avoid chain transfer. The following examples are given at Col. 4, lines 20–25:

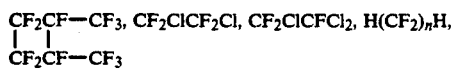

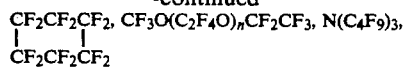

Many of the compounds containing chlorine that were previously disclosed as useful solvents have a high potential for destroying ozone in the stratosphere. Perfluorocarbons, which have also been proposed as solvents for these polymerizations, are so-called greenhouse gases, and may cause global warming. It is desirable to provide solvents for fluoromonomer polymerizations which do not have a high potential to deplete ozone or cause global warming, while at the same time are convenient to use in the polymerization and don't adversely affect the properties of the polymer obtained.

SUMMARY OF THE INVENTION

The invention concerns a polymerization process, comprising, contacting a fluoromonomer, a free radical source capable of initiating polymerization of said fluoromonomer, and a solvent wherein the solvent:

is a saturated organic compound which can, optionally, contain one carbon-carbon double bond;

contains carbon, fluorine, at least one hydrogen atom bound to a carbon atom, and optionally one or more ether oxygen atoms or one or more alcohols or one or more ether oxygen atoms and one or more alcohols;

contains at least as many fluorine atoms as hydrogen atoms;

optionally contains one or more —$CF_2OCH_3$ group(s);

contains no more than two adjacent —$CH_2$— groups; and has no hydrogen atoms on any primary carbon; provided that:

when water is less than about 20 volume percent of the polymerization medium, said polymerization process is carried out at a temperature below about 100° C.;

if the solvent contains said carbon-carbon double bond, the solvent itself shall not be polymerizable under process conditions;

the solvent shall have a boiling point at atmospheric pressure of about 0° C. to about 150° C.; and if adjacent —$CH_2$— groups are present, any carbon atom alpha to either of the —$CH_2$— groups has no hydrogen bound to it.

DETAILS OF THE INVENTION

This invention deals with improved solvents for use in the polymerization of fluoromonomers. The resulting polymers are useful as thermoplastics and elastomers. By fluoromonomers are meant compounds that may be free radically polymerized, that contain at least one vinylic fluorine atom attached to the vinyl group that undergoes polymerization, and the compounds 3,3,3-trifluoropropene and 2-trifluoromethyl-3,3,3-trifluoro-1-propene. Useful fluoromonomers containing a vinylic fluorine atom include, but are not limited to, vinyl fluoride; vinylidene fluoride; trifluoroethylene; chlorotrifluoroethylene; 1,2-difluoroethylene; tetrafluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$;

$CF_2=CFOCF_2CF(CF_3)OCF_2CF_2CO_2CH_3$; $CF_2=CFOCF_2CF_2SO_2F$; $F(CF_2)_nCH_2OCF=CF_2$ where n is 1, 2, 3, 4, or 5; $R^1CH_2OCF=CF_2$ where $R^1$ is hydrogen or $F(CF_2)_m-$ and m is 1, 2, or 3; and $R^3OCF=CH_2$ where $R^3$ is $F(CF_2)_m-$ where z is 1, 2, 3, or 4. Preferred fluorinated monomers are 3,3,3-trifluoropropene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), and perfluoro(2,2-dimethyl-1,3-dioxole).

The fluoromonomer may be polymerized alone to form a homopolymer if the fluoromonomer usually can be homopolymerized, or may be polymerized with one or more other fluoromonomers or other monomers which are not fluoromonomers to form a copolymer. If a copolymer is to be formed, the monomers chosen must be able to copolymerize. Such copolymerizable monomer combinations are known, see for example D. P. Carlson and W. Schmiegel, in W. Gerhartz, et al., Ed., Ullmann's Encyclopedia of Industrial Chemistry, 5th Ed, vol. All, VCH Verlasgesellschaft mbH, Weinheim, 1988, p. 393-429, and various individual articles in H. Mark et al., Ed., Encyclopedia of Polymer Science and Engineering, John Wiley & Sons, New York, 1985, both of which are hereby included by reference. Comonomers that copolymerize with some combinations of fluoromonomers include propylene and ethylene. Useful copolymers that can be made by the instant process include, but are not limited to, tetrafluoroethylene/hexafluoropropylene, tetrafluoroethylene/hexafluoropropylene/vinylidene fluoride, hexafluoropropylene/vinylidene fluoride, tetrafluoroethylene/perfluoro(propyl vinyl ether), tetrafluoroethylene/perfluoro(2,2-dimethyl-1,3-dioxole), tetrafluoroethylene/ethylene, tetrafluoroethylene/$CF_2=CFOCF_2CF(CF_3)OCF_2CF_2SO_2F$, tetrafluoroethylene/$CF_2=CFOCF_2CF_2SO_2F$, tetrafluoroethylene/hexafluoropropylene/perfluoro propyl vinyl ether and tetrafluoroethylene/propylene. If a copolymer is made, it is preferred if at least 1%, more preferably at least about 10%, and especially preferable at least about 25%, of the total monomer units present in the polymer be fluoromonomers.

Another essential component of the process is a free radical source which is capable of polymerizing the fluoromonomer and other monomers present. Typically, such free radical sources include organic compounds capable of thermally decomposing to free radical species, and in aqueous systems (see below) redox type initiators are often used. However, any source of appropriate free radicals may be used in the process, for instance an organic compound that decomposes on exposure to ultraviolet light, assuming that the apparatus used for the process allows the process medium to be exposed to ultraviolet light. Not all free radical sources will polymerize any particular fluoromonomer or combination of monomers. Free radical sources effective with various fluoromonomers and monomer combinations are known. See, for example, J. C. Masson in J. Brandrup and E. H. Immergut, Ed., Polymer Handbook, 3rd Ed., John Wiley & Sons, New York, 1989, p.II/1–II/65, and C. S. Sheppard and V. Kamath in H. F. Mark. et al., Ed., Encyclopedia of Chemical Technology, 3rd Ed., vol. 13, John Wiley & Sons, New York, 1981, p. 355-373, both of which are here included by reference. Typical organic compounds that thermally decompose that are useful for at least some fluoromonomers are azobisisobutyronitrile, azobisisovaleronitrile, acetyl peroxide, $\{CF_3CF_2CF_2[CF(CF_3)CF_2O]_xCF(CF_3)COO\}_2$ where x is 0 or an integer of 1 to 20, $CF_3CF_2CF_2O[CF(CF_3)CF_2O]_xCF(CF_3)COOF$ where x is 0 or an integer of 1 to 20, $[CF_3(CF_2)_nCOO]-_2$, $HCF_2(CF_2)_nCOO]-_2$, $[ClCF_2(CF_2)_nCOO]-_2$, $CF_3(CF_2)_nCOOF$, $HCF_2(CF_2)_nCOOF$, and $ClCF_2(CF_2)nCOOF$, all where n is 0 or an integer of 1 to 8. Redox type free radical sources include, but are not limited to, potassium persulfate, or a combination of persulfate and bisulfite (usually as alkali metal salts). Ionic species are especially useful in aqueous systems.

Solvents used in the instant process can perform one or more than one function. They may be used as solvents for one or more of the constituents such as a monomer or free radical source, since adding such ingredients as solutions may be more convenient or accurate. The solvent may actually function as a solvent for the polymer that is made in the process (although the term solvent in this case does not necessarily imply that the polymer formed is soluble in the solvent), so that a true solution polymerization is carried out. However, solvent, as used herein, may also be present in other types of polymerizations, such as aqueous emulsion or suspension, or nonaqueous suspension polymerizations.

It is desirable that the solvent be readily removed from the polymer once the polymerization is completed. Solvents are often removed by distillation or evaporation, so it is preferred if the solvent is volatile. Thus, the boiling point of the solvent described herein is no higher than about 150° C., preferred if it is no higher than 120° C. and more preferred if it is no higher than 100° C. Conversely, the solvent should not have a very low boiling point. Solvents that boil well below process temperature add their vapor pressure to the total pressure generated in the process, which may lead to the need for more expensive process equipment capable of holding higher pressures, or could inadvertently evaporate leaving possibly dangerous residues (e.g., peroxide residue if peroxide is used as the initiator). Thus, the solvent has an atmospheric pressure boiling point of about 0° C. or higher, preferably about 20° C. or higher. It is preferred if the solvent has a boiling point of about 0° C. to about 150° C., more preferred if the solvent has a boiling point of about 20° C. to about 120° C., and especially preferred if the solvent has a boiling point of about 20° C. to about 100° C.

The solvents used in the present process have several limitations on their structures, some of which are described below. The solvent:
- is a saturated organic compound which can, optionally, contain one carbon-carbon double bond;
- contains carbon, fluorine, at least one hydrogen atom bound to a carbon atom, and optionally one or more ether oxygen atoms and/or one or more alcohols;
- contains at least as many fluorine atoms as hydrogen atoms;
- optionally contains a $CF_2OCH_3$ group; and
- contains no more than two adjacent —$CH_2$— groups.

By saturated organic compound is meant a compound which, excluding the optional double bond, is a linear, branched or cyclic (including fused and multiple rings) aliphatic compound, or any combination of the three. There may, optionally, be present one carbon-carbon double bond, provided that this double bond does not take part in free radical polymerization. Typically, these are double bonds that are sterically hindered, such as in the compound 1,2-(perfluoro-n-butyl)ethylene.

The solvent contains, beside carbon atoms, fluorine atoms and at least one hydrogen atom bound to a carbon atom. The solvent may, in addition, contain one or more oxygen atoms, but these oxygen atoms must be present as ether and/or alcohol functionalities. The presence of at least one hydrogen atom bound to a carbon atom in the compound renders the compound less likely to cause a "greenhouse effect" in the earth's atmosphere. In order to avoid solvent chain transfers and/or terminations, the solvent should contain at least as many fluorine atoms as hydrogen atoms. It is preferred if the solvent contains more fluorine atoms than hydrogen atoms. A typical alcohol functionality is —$CH_2OH$, but any stable alcohol group may be present.

Certain monomers may not be polymerizable in all solvents. Some of these non-polymerizable monomer-solvent-initiator combinations are known in the art. The polymerizability of a monomer in a particular solvent is readily determined by carrying out a small scale polymerization. Such small scale polymerizations involve minimal experimentation.

By "primary carbon atom" is meant a carbon atom bound to only one other carbon atom. The term "primary carbon atom" does not mean a carbon atom bound to an ether oxygen but to no other carbon atom or a carbon atom bound to an ether oxygen and one other carbon atom or a carbon atom bound to a hydroxyl group and one other carbon atom.

The arrangement of the hydrogen atoms in the solvent is important, particularly for avoiding chain transfer and/or termination reactions. Thus, the solvent should contain no methyl (—$CH_3$) groups, except as the grouping —$CF_2OCH_3$, and may not contain more than two adjacent —$CH_2$— groups. By —$CH_2$— group is meant a simple methylene group. By adjacent —$CH_2$— groups is meant two of the groups bound to each other, i.e., —$CH_2$—$CH_2$—. Thus, compounds such as $CF_3CH_2CF_2CH_2CF_3$, $CF_3CH_2CFHCH_2CF_3$ $CF_3CH_2CH_2CF_2CF_3$, $CF_3CF_2CH_2CFH_2$. 1,1,2,2-tetrafluoro-cyclobutane and 2,2-bis(trifluoromethyl)-1,3-dioxolane are useful solvents as defined herein, A group such as $CH_2CH_2CHF$— may not be present since this contains a hydrogen bound to a carbon atom alpha to one of two adjacent methylene groups.

In one preferred embodiment of the solvent, not more than two hydrogen atoms can be bound to carbon atoms (other than methyl groups) adjacent to any particular ether oxygen atom. Thus, the structures —$CH_2$—O—$CF_2$— and —CHF—O—CHF— are both preferred, while the structures —$CH_2$—O—CHF— and —$CH_2$—O—$CH_2$— are not preferred.

Useful solvents include, but are not limited to, $CF_3CF_2CF_2O[CF(CF_3)CF_2O]_qCFHCF_3$, $H(CF_2)_zH$, $H(CF_2)_zCF_3$, $CH_3OCF_2CFHCF_3$, $CF_3(CF_2)_xCFH(CF_2)_yCF_3$, $CF_3(CF_2)_xCFHCF_2H$, $CF_3(CF_2)_xCFHCFH(CF_2)_yCF_3$, $CF_3(CF_2)_xCH_2(CF_2)_yCF_3$, $CF_3(CF_2)_xCFHCH_2(CF_2)_yCF_3$, 1,1,2,2,-tetrafluorocyclobutane, 1-trifluoromethyl-1,2,2-trifluorocyclobutane, 1,2-bis(perfluoro-n-butyl)ethylene, and 2,2-bis(trifluoromethyl)-1,3-dioxolane, wherein q is 0 or 1; z is an integer of 2 to about 10; x is 0 or an integer of 1 to about 8; and y is independently 0 or an integer of 1 to about 8. Preferred solvents are 1,1,2,2-tetrafluorocyclobutane, 1-trifluoromethyl-1,2,2-trifluorocyclobutane, $CH_3OCF_2CFHCF_3$ and $CF_3CFHCFHCF_2CF_3$.

The limitations on the structure of the solvent discussed above are designed to avoid solvents that cause chain transfer or termination of the polymerization. It is known that most organic compounds that contain hydrogen atoms bound to carbon cause some chain transfer and/or termination in polymerizations of fluoromonomers. Thus, if one uses as a solvent a compound that does contain carbon-hydrogen bonds, consistent with the other requirements for the solvent, one must choose a solvent that causes minimal chain transfer and/or termination of the polymerization, assuming relatively high molecular weight polymer is desired. The amount of chain transfer that occurs will depend on many factors, such as the fluoromonomer(s) being polymerized, the concentration of potential chain transfer/termination molecules such as solvent, the temperature, and the type (e.g. emulsion or suspension) of process being used. In some processes chain transfer agents are deliberately added in specific amounts to control the molecular weight.

Within any given set of process conditions, e.g., fluoromonomer, temperature, it is expected that the various structures possible, within the limitations placed on the solvent herein, will affect chain transfer to varying degrees, but will, in general, result in relatively insignificant amounts of chain transfer, and little or no termination. A practical process does not necessarily depend on having no chain transfer and/or termination, but only on having minimal amounts of either or both, so that the polymer produced has acceptable properties.

The amount of chain transfer and/or termination obtained with a polymerization system varies with the temperature. Generally speaking, the higher the temperature with any given system, the more chain transfer and/or termination that will occur due to hydrogen abstraction from the solvent. This particularly applies to systems containing little or no water. Thus, if water is less than about 20% of the polymerization medium (all of the liquid present in the process), the process is carried out at less than about 100° C. Therefore, in processes containing less than 20 volume percent water, it is preferred if the polymerization temperature is below about 100° C., and preferably below about 80° C. for any amount of water present.

The amount of chain transfer and/or termination will also vary with the concentration of the potential chain transfer compound, for example solvent. The higher the concentration of the potential chain transfer compound in the vicinity of the free radical containing species, the more chain transfer that will take place. Thus, solution polymerization generally provides the highest amount of chain transfer to solvent, while two phase systems such as suspensions and aqueous emulsions vary according to the overall concentration of the solvent and the concentration of the solvent in the vicinity of the free radical species. Depending on the relative amount of chain transfer and/or termination acceptable, suitable solvents can be chosen from those described herein, based on simple experimentation, i.e., trial polymerizations. Such polymerizations are known to those skilled in the art, see for example Ullmann's and Encyclopedia of Polymer Science and Engineering, supra.

In the following Examples, Freon ® 113 (available from E. I. du Pont de Nemours and Co., Wilmington, Del.) is 1,1,2-trichloro-1,2,2-trifluoroethane. Melt index tests were run using a Slocomb Model F extrusion plastometer with a 316 stainless steel die 0.947 cm in diameter and with a hole 0.318 cm long and 0.0794 cm in diameter. The plastometer was heated to 297° or 372° C., depending on the polymer. After loading 2 g samples of polymer, reinserting the piston, and waiting 5 min for thermal equilibration, the piston was loaded with a dead weight so that the piston and dead weight together total 5 or 15 kg, as appropriate for the viscosity of the sample. The time required for all or part of the polymer to be extruded was measured, stopping after 5 min for polymers showing no extrusion at all. The weight of polymer extruded divided by the number of minutes over which the extrusion occurred is reported here as the melt index. Polymer melting points were determined by Differential Scanning Calorimetry and are first heats.

EXAMPLES

Examples 1-6

Polymerization of Vinyl Fluoride

A 400 ml pressure tube loaded with 200 ml of water was chilled to −20° C. and 10 ml of 0.065M HFPO dimer peroxide initiator {[$CF_3CF_2CF_2OCF(CF_3)COO$]$_2$} in 2,2-bis(trifluoromethy)-1,3-dioxolane solvent added. The tube was sealed, evacuated, and filled with 100 g of inhibitor free vinyl fluoride. Heating 4 hr at 36 to ° C, filtering, washing with methanol/water, and drying under vacuum gave 48 g of white polymer with the analyses shown in Table 1. A duplicate run at 34° to 41° C. gave 44 g of polymer. Results in the presence of other hydrofluorocarbon solvents under similar conditions are shown in Table 1, except the amounts of initiator varied from 5 to 10 ml of a 0.03 to 0.33 M solution.

Examples 7-13

Preparation of Tetrafluoroethylene/Hexafluoropropylene Copolymers

A 400 ml pressure tube loaded with 200 ml of water was chilled to −20° C. and 5 ml of 0.05M HFPO dimer peroxide initiator in 1,1,2,2-tetrafluorocyclobutane solvent added. The tube was sealed, evacuated, and filled with 240 g of hexafluoropropylene and 50 g of tetrafluoroethylene. Heating 4 hr at 33 to 35° C., filtering, washing with methanol/Freon ® 113, and drying under vacuum gave 37 g of white polymer. Infrared analysis found 7.5 weight percent hexafluoropropylene and no detectable end groups. Melt extrusion at 372° C. with a 15 kg weight gave a translucent bubble free ribbon at 0.05 g/min. A duplicate run at 33° to 36° C. gave 34 g of polymer. Results in the presence of other hydrofluorocarbon solvents under similar conditions are shown in Table 2, except the amounts of initiator varied from 5 to 10 ml of a 0.05 to a 0.33M solution.

TABLE 2

| EXAMPLE | SOLVENT | YIELD | % HFP | 372° C. MELT INDEX |
|---|---|---|---|---|
| 7 | $CF_3CH_2OH$ | 17 g | 4.6 | 0 (15 KG) |
|   | $CF_3CH_2OH$ | 17 g | 5.6 | 0 (15 KG) |
| 8 | 1,1,2,2-TETRAFLUOROCYCLOBUTANE | 37 g | 7.5 | 0.05 (15 KG) |
|   | 1,1,2,2-TETRAFLUOROCYCLOPUTANE | 34 g | 8.4 | 0.05 (15 KG) |
| 9 | BIS(TRIFLUOROMETHYL)DIOXOLANE | 33 g | 8.3 | 0.5 (15 KG) |
|   | BIS(TRIFLUOROMETHYL)DIOXOLANE | 35 g | 7.9 | 0.6 (15 KG) |
| 10 | $CF_3CFHCFHCF_2CF_3$ | 40 g | 9.8 | 1.0 (15 KG) |
|    | $CF_3CFHCFHCF_2CF_3$ | 43 g | 8.6 | 1.3 (15 KG) |
| 11 | $CF_3CFHCF_2OCH_3$ | 30 g | 8.4 | 1.3 (5 KG) |
|    | $CF_3CFHCF_2OCH_3$ | 30 g | 8.1 | 0.4 (5 KG) |
| 12 | $C_nF_{2n+1}H$, n = 6-8 (trace $I_2$)[1] | 42 g | 8.6 | 1.8 (5 KG) |
|    | $C_nF_{2n+1}H$, n = 6-8 (trace $I_2$) | 39 g | 8.8 | 1.3 (5 KG) |
| 13 | $HCF_2CF_2CF_2CF_2H$ | 35 g | 9.5 | 0.4 (15 KG) |
|    | $HCF_2CF_2CF_2CF_2H$ | 42 g | 9.2 | 0.4 (15 KG) |

[1]Chain Transfer Agent

Examples 14-19

Preparation of Tetrafluoroethylene-Perfluoro(propyl vinyl ether) Copolymers

A 400 ml pressure tube loaded with 100 ml of water was chilled to −20° C. and 5 ml of 0.066M HFPO dimer peroxide initiator in 1,1,1,2,2,3,4,5,5,5-decafluoropentane solvent added. The tube was sealed, evacuated, and filled with 5 g of perfluoro (propyl vinyl ether) and 50 g of tetrafluoro-ethylene. Heating 4 hr at 35° C., filtering, washing with methanol/Freon ® 113, and drying under vacuum gave 43 g of white polymer. Infrared analysis found 2.2 weight percent perfluoro-

TABLE 1

| EXAMPLE | SOLVENT | YIELD | MELTING POINT (°C.) |
|---|---|---|---|
| 1 | 1,1,2,2-TETRAFLUOROCYCLOBUTANE | 12 g | 211 |
|   | 1,1,2,2-TETRAFLUOROCYCLOBUTANE | 13 g | 211 |
| 2 | BIS(TRIFLUOROMETHYL)DIOXOLANE | 48 g | 210 |
|   | BIS(TRIFLUOROMETHYL)DIOXOLANE | 44 g | 210 |
| 3 | $CF_3CFHCFHCF_2CF_3$ | 42 g | 210 |
|   | $CF_3CFHCFHCF_2CF_3$ | 63 g | 212 |
| 4 | $C_nF_{2n+1}H$, n = 6-8 (trace $I_2$)[1] | 50 g | 210 |
|   | $C_nF_{2n+1}H$, n = 6-8 (trace $I_2$) | 48 g | 210 |
| 5 | $HCF_2CF_2CF_2CF_2H$ | 43 g | 210 |
|   | $HCF_2CF_2CF_2CF_2H$ | 35 g | 211 |
| 6 | $CF_3CF_2CF_2OCF(CF_3)CF_2OCFHCF_3$ | 63 g | 212 |

[1]Chain Transfer Agent propylvinyl ether and acid and acid fluoride end groups. The polymer would not extrude, with a 15 kg weight, at 372° C. (Lower molecular weights can probably be obtained by running at higher temperatures or by adding chain transfer agents.) A duplicate run at 35° C. gave 40g of polymer. Results in the presence of other hydrofluorocarbon solvents under similar conditions are shown in Table 3, except the amounts of initiator varied from 5 to 10 ml of a 0.05 to 0.33M solution.

TABLE 3

| EXAMPLE | SOLVENT | YIELD | % PPVE | 372° C. MELT INDEX |
|---|---|---|---|---|
| 14 | 1,1,2,2-TETRAFLUOROCYCLOBUTANE | 38 g | 2.6 | 0 (15 KG) |
|  | 1,1,2,2-TETRAFLUOROCYCLOPUTANE | 38 g | 3.4 | 0 (15 KG) |
| 15 | BIS(TRIFLUOROMETHYL)DIOXOLANE | 39 g | 3.3 | 0 (15 KG) |
|  | BIS(TRIFLUOROMETHYL)DIOXOLANE | 27 g | 1.8 | 0 (15 KG) |
| 16 | $CF_3CFHCFHCF_2CF_3$ | 43 g | 3.1 | 0 (15 KG) |
|  | $CF_3CFHCFHCF_2CF_3$ | 40 g | 3.2 | 0 (15 KG) |
| 17 | $CF_3CFHCF_2OCH_3$ | 44 g | 3.1 | 0 (15 KG) |
|  | $CF_3CFHCF_2OCH_3$ | 48 g | 3.2 | 0 (15 KG) |
| 18 | $C_nF_{2n+1}H$, n = 6–8 (trace $I_2$)[1] | 53 g | 3.8 | 0.05 (15 KG) |
|  | $C_nF_{2n+1}H$, n = 6–8 (trace $I_2$) | 46 g | 3.4 | 0.1 (15 KG) |
| 19 | $HCF_2CF_2CF_2CF_2H$ | 38 g | 3.4 | 0 (15 KG) |
|  | $HCF_2CF_2CF_2CF_2H$ | 45 g | 3.1 | 0 (15 KG) |

[1] Chain Transfer Agent

Example 20

A 400 ml pressure tube loaded with 300 ml of water was chilled to −20° C. and 1 ml or perfluorobutylethylene and 5 ml of 0.33M HFPO dimer peroxide initiator in 1,4-dihydroperfluorobutane solvent added. The tube was sealed, evacuated, and filled with 14 g of ethylene and 50 g of tetrafluoroethylene. Reaction at 35° to 43° C. (exotherm, cooling required), filtering, washing with methanol/Freon ® 113, and drying under vacuum gave 26 g of white polymer too high in molecular weight to melt extrude at 297° C. with a 15 kg weight. A duplicate run at 35° to 54° C. gave 44 g of polymer also too high in molecular weight to extrude at 297° C.

Example 21

A 400 ml pressure tube loaded with 100 ml of water was chilled to −20° C. and 10 ml of 0.02M bis(perfluoropropionyl) peroxide initiator in 2,2-bis(trifluoromethyl)1-3-dioxolane solvent added. The tube was sealed, evacuated, and filled with 5 g of perfluoropropylvinyl ether and 50 g of tetrafluoroethylene. Heating 4 hr at 47° to 50° C., filtering, washing with methanol/Freon ® 113, and drying under vacuum gave 37 g of white polymer. The polymer extruded at 0.7 g/min, with a 15 kg weight, at 372° C. A duplicate run at 49° to 51° C. gave 17g of polymer extruding at 0.3 g/min at 372° C.

Example 22

A 400 ml pressure tube loaded with 200 ml of water was chilled to −20° C. and 10 ml of 0.068M HFPO dimer peroxide initiator in methyl 1,1,2,3,3,3-hexafluoropropyl ether ($CH_3OCF_2CFHCF_3$) solvent was added. The tube was sealed, evacuated, and filled with 100 g of vinyl fluoride. Heating four hours at 38° to 39° C., filtering, washing with methanol and then Freon ® 113, and drying under vacuum gave 52 g of white polymer with a first DSC melt point of 211° C. A duplicate run at 35° to 37° C. gave 50 g of polymer with a first DSC melting point of 212° C.

Example 23

Into an evacuated, agitated 1 liter stainless steel autoclave were placed 320 ml methyl 1,1,1,2,3,3-hexafluoropropyl ether, 480 ml of 1,1,2-trichloro-1,2,2-trifluoroethane (Freon ® 113), 30.6 g of perfluoropropyl vinyl ether (PPVE), and 10 ml of a solution of 0.0242 g/ml methanol in Freon ® 113. The autoclave was heated to 60° C., the agitator was set at 1000 rpm, and the clave was pressured to 4.09 kg/cm² with tetrafluoroethylene (TFE). The autoclave was then charged with 10 ml of an initiator solution of 0.0029 g/ml of bis(perfluoropropionyl) peroxide in Freon ® 113, and addition was continued at the rate of 0.5 ml/min throughout the batch. After kickoff the pressure was maintained at 4.09 kg/cm² by addition of TFE gas. The polymerization was continued for 15 min after which the contents of the clave was discharged into a large stainless steel beaker. The polymer was recovered by drying it in an air oven at 125° C. overnight. The dry polymer weighed 44.2 g. The PPVE content was 4.3 weight %.

Into an evacuated, agitated 1 liter stainless steel autoclave were placed 320 ml of methyl 1,1,1,2,3,3-hexafluoropropyl ether, 480 ml of 1,1,2-trichloro-1,2,2-trifluoroethene (Freon ® 113), 3 ml cyclohexane, and 3 ml of perfluorobutyl ethylene (PFBE). The temperature was raised to 60° C. and the agitator was set at 1000 rpm. To this mixture was charged ethylene to a pressure of 2.47 kg/cm² and tetrafluoroethylene (TFE) to a total pressure of 6.90 kg/cm² The autoclave was then charged with 25 ml of a solution of 0.0029 g/ml bis(perfluoropropionyl) peroxide initiator in Freon ® 113 and addition was continued throughout the batch at a rate of 1 ml/min. The pressure was kept constant by the constant addition of a mixture of TFE and ethylene in such a proportion to maintain the gas phase of the autoclave at 70 mole percent TFE. The polymerization was continued for 15 min after which time the contents of the clave were discharged into a large stainless steel beaker. The polymer was recovered by drying it in an air oven at 125° C. overnight. The dry polymer weighed 24.8 g. The analysis of the copolymer showed it to contain 51.2 mole % TFE, and 0.78 mole % PFBE.

Examples 25–26

2,2,2-Trifluoroethanol Solvent; HFPO Dimer Peroxide Initiation and Under Nonaqueous Conditions A 400 ml pressure tube loaded with 100 ml of 2,2,2-trifluoroethanol was chilled to −20° C. and 5 ml of 0.2 M HFPO dimer peroxide in 2,2,2-trifluoroethanol solvent added. The tube was sealed, evacuated, and filled with 3 g of perfluoropropylvinyl ether and 50 g of tetrafluoroethylene. Heating for four hours at 35° C, venting, filtering, washing with Freon® 113, and drying gave 34 g of white polymer, extruding as brown ribbon at 2 g/min, with a 15 kg weight, at 372° C. Infrared analysis found 3.7 weight percent perfluoropropylvinyl ether and carboxylic acid end groups in the polymer.

Table 4 summarizes the results of fluoroolefin polymerizations run under nonaqueous conditions in pure trifluoroethanol.

TABLE 4

| EXAMPLE | SOLVENT | MONOMER(S) | CONVERSION | MELT INDEX[1] |
|---|---|---|---|---|
| 25 | $CF_3CH_2OH$ | TFE/HFP | 13% of TFE | 4 g/min (15 kg) |
| 26 | $CF_3CH_2OH$ | TFE/PPVE | 65% of TFE | 2 g/min (15 kg) |

[1]Run at 372° C.

Example 27

Polymerization in Pure 1,1,1,2,2,3,4,5,5,5-decafluoropentane

Into an evacuated, one liter, stainless steel, agitated pressure vessel were charged 800 ml of 1,1,1,2,2,3,4,5,5,5-decafluoropentane, 0.25 g of methanol in 10 ml of 1,1,2-trichloro-1,2,2-trifluoroethane (Freon® 113), and 20 ml of perfluoropropyl perfluorovinyl ether (PPVE). The mixture was heated to 60° C. while agitating at 1000 rpm, and tetrafluoroethylene (TFE) was charged to the vessel until 68 psig pressure was attained. Then 0.036 g of bis(perfluoropropionyl) peroxide (3P) in 10 ml of Freon ® 113 was pumped into the clave. At kick-off (3 psi pressure drop), 3 P solution (0.0036 g/ml in F 113) addition was started at a rate of 0.50 ml/min and autoclave pressure was maintained at 68 psig by continuous addition of additional TFE. The temperature was maintained at 60° C. After 15 minutes reaction time, the TFE and 3 P feeds were shut off and the autoclave was cooled to 30° C. The polymer gel was removed from the bottom of the autoclave and the solvent was allowed to evaporate in a vented hood and circulating air oven at 150° C. The polymer was then weighed and characterized.

The dry polymer weighed 29.7 g and had a melt viscosity of $10.7 \times 10^4$ poise, and contained 4.12 wt % PPVE. Viscosity was measured using the apparatus of ASTM D-1238, using a 5000 gm weight, at 372° C.

In a comparative example identical to the above except that 800 ml of Freon® 113 was used instead of 1,1,1,2,2,3,4,5,5,5-decafluoropentane, 23.6 g of polymer was obtained which had a melt viscosity of $2.7 \times 10^4$ poise.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A polymerization process, comprising, contacting a fluoromonomer, a free radical source capable of initiating polymerization of said fluoromonomer, and a solvent wherein the solvent:

is a saturated organic compound or a saturated organic compound containing one carbon-carbon double bond;

contains only carbon, fluorine, and at least one hydrogen atom, or contains only carbon, fluorine, at least one hydrogen atom and one or more ether oxygen atoms or one or more alcohols or one or more ether oxygen atoms and one or more alcohols;

contains at least as many fluorine atoms as hydrogen atoms;

contains no more than two adjacent —$CH_2$— groups; and has no hydrogen atoms on any primary carbon or has hydrogen atoms on primary carbon only in —$CF_2OCH_3$ groups;

provided that:

when water is less than about 20 volume percent of the polymerization medium, said polymerization process is carried out at a temperature below about 100° C.;

if the solvent contains said carbon-carbon double bond, the solvent shall not be polymerizable under process conditions;

said solvent shall have a boiling point at atmospheric pressure of about 0° C. to about 150° C.;

if adjacent —$CH_2$— groups are present, any carbon atoms alpha to each of the —$CH_2$— groups has no hydrogen bound to it.

2. The process as recited in claim 1 wherein said solvent is selected from $CF_3CF_2CF_2O[CF(CF_3)CF_2O]_qCFHCF_3$, $CH_3OCF_2CFHCF_3$, $CF_3(CF_2)_xCFH(CF_2)_yCF_3$, $CF_3(CF_2)_xCFHCFH(CF_2)_yCF_3$, $CF_3(CF_2)_xCH_2(CF_2)_yCF_3$, $CF_3(CF_2)_xCFHCH_2(CF_2)_yCF_3$, 1,1,2,2,-tetrafluorocyclobutane, 1-trifluoromethyl-1,2,2-trifluorocyclobutane, 1,2-bis(perfluoro-n-butyl)ethylene, or 2,2-bis(trifluoromethyl)-1,3-dioxolane, wherein q is 0 or 1; z is an integer of 2 to about 10; x is 0 or an integer of 1 to about 8; and y is independently 0 or an integer of 1 to about 8.

3. The process as recited in claim 2 wherein said solvent is selected from 1,1,2,2-tetrafluorocyclobutane, 1-trifluoromethyl-1,2,2-trifluorocyclobutane, $CF_3CFHCFHCF_2CF_3$, and $CH_3OCF_2CFHCF_3$.

4. The process as recited in claim 1 or claim 2 wherein said fluoromonomer is vinyl fluoride; vinylidene fluoride; trifluoroethylene; chlorotrifluoroethylene; 1,2-difluoroethylene; tetrafluoroethylene; hexafluoropropylene; perfluoro(methyl vinyl ether); perfluoro(propyl vinyl ether); perfluoro(2,2-dimethyl-1,3-dioxole); $CF_2=CFOCF_2CF(CF_3)OCF_2CF_2SO_2F$; $CF_2=CFOCF_2CF(CF_3)OCF_2CF_2CO_2CH_3$; $CF_2=CFOCF_2CF_2SO_2F$; $F(CF_2)_nCH_2OCF=CF_2$ where n is 1, 2, 3, 4, or 5; $R^1CH_2OCF=CF_2$ where $R^1$ is hydrogen or $F(CF_2)_m$— and m is 1, 2 or 3; or $R^3OCF=CH_2$ where $R^3$ is $F(CF_2)_z$— where z is 1, 2, 3 or 4.

5. The process as recited in claim 4 wherein said fluoromonomer is 3,3,3-trifluoropropene, 2-trifluoromethyl-3,3,3-trifluoro-1-propene, vinyl fluoride, vinylidene fluoride, tetrafluoroethylene, hexafluoropropylene, perfluoro(methyl vinyl ether), perfluoro(propyl vinyl ether), or perfluoro(2,2-dimethyl-1,3-dioxole).

6. The process of claim 4 wherein the fluoromonomer is selected from trifluoroethylene; chlorotrifluoroethylene; tetrafluoroethylene; hexafluoropropylene; perfluoro(methyl vinyl ether); perfluoro(propyl vinyl ether); PFBE, and hexafluoroisobutene.

7. The process of claim 6 wherein the fluoromonomer is selected from trifluoroethylene; tetrafluoroethylene; hexafluoropropylene; perfluoro(methyl vinyl ether); and perfluoro(propyl vinyl ether).

8. The process as recited in claim 1 wherein said temperature is below about 80° C.

9. The process as recited in claim 2 carried out at a temperature below about 80° C.

10. The process as recited in claim 1 wherein said boiling point is about 20° C. to about 120° C.

11. The process as recited in claim 10 wherein said boiling point is about 20° C. to about 100° C.

12. The process as recited in claim 4 wherein said boiling point is about 20° C. to about 100° C.

13. The process as recited in claim 1 or claim 4 wherein the solvent has no more than two hydrogen atoms bound to carbon atoms adjacent to an ether oxygen atom.

14. The process as recited in claim 1 or claim 4 wherein said free radical source is azobisisobutyronitrile, azobisisovaleronitrile, acetyl peroxide, $\{CF_3CF_2CF_2[CF(CF_3)CF_2O]_xCF(CF_3)COO\}_2$ where x is 0 or an integer of 1 to 20, $CF_3CF_2CF_2O[CF(CF_3)CF_2O]_xCF(CF_3)COOF$ where x is 0 or an integer of 1 to 20, $[CF_3(CF_2)_nCOO]-_2$, $[HCF_2(CF_2)_nCOO]-_2$, $[ClCF_2(CF_2)_nCOO]-_2$, $CF_3(CF_2)_nCOOF$, $HCF_2(CF_2)_nCOOF$, or $ClCF_2(CF_2)_nCOOF$, where n is 0 or an integer of 1 to 8.

15. The process as recited in claim 1 or claim 2 wherein a tetrafluoroethylene/hexafluoropropylene, tetrafluoroethylene/hexafluoropropylene/vinylidene fluoride, hexafluoropropylene/vinylidene fluoride, tetrafluoroethylene/perfluoro(propyl vinyl ether), tetrafluoroethylene/perfluoro(2,2-dimethyl-1,3-dioxole), tetrafluoroethylene/ethylene, tetrafluoroethylene/$CF_2$=$CFOCF_2CF(CF_3)OCF_2CF_2SO_2F$, tetrafluoroethylene/$CF_2$=$CFOCF_2CF_2SO_2F$, or tetrafluoroethylene/propylene copolymer is produced.

16. The process of claim 1 wherein the solvent is $CF_3CFHCFHCF_2CF_3$.

17. The process of claim 1 wherein the solvent is $CF_3CFHCF_2OCH_3$.

18. The process of claim 1 wherein the solvent is 1,1,2,2-tetrafluorocyclobutane.

19. The process of claim 1 wherein the solvent is 2,2-bis(trifluoromethyl)-1,3-dioxolane.

20. The process of claim 1 wherein the solvent is 1-trifluoromethyl-1,2,2-trifluorocyclobutane.

21. The process as described in claim 16, 17, 18, 19 or 20 wherein the reaction medium is an aqueous emulsion or aqueous suspension.

22. The process described in claim 16, 17, 18, 19, 20 or 21 wherein the monomer is selected from trifluoroethylene; chlorotrifluoroethylene; tetrafluoroethylene; hexafluoropropylene; perfluoro(methyl vinyl ether); perfluoro(propyl vinyl ether); PFBE, and hexafluoroisobutene.

23. The process of claim 1 wherein the saturated organic compound contains one or more ether oxygen atoms or one or more alcohols or one or more ether oxygen atoms and one or more alcohols.

24. The process of claim 1 wherein the saturated organic compound contains one carbon-carbon double bond.

25. The process of claim 1 wherein the saturated organic compound contains one or more —$CF_2OCH_3$ groups.

* * * * *